Feb. 18, 1958 G. E. IRVING 2,823,506
DOUBLE SICKLE MOWER
Filed May 13, 1955 5 Sheets-Sheet 1
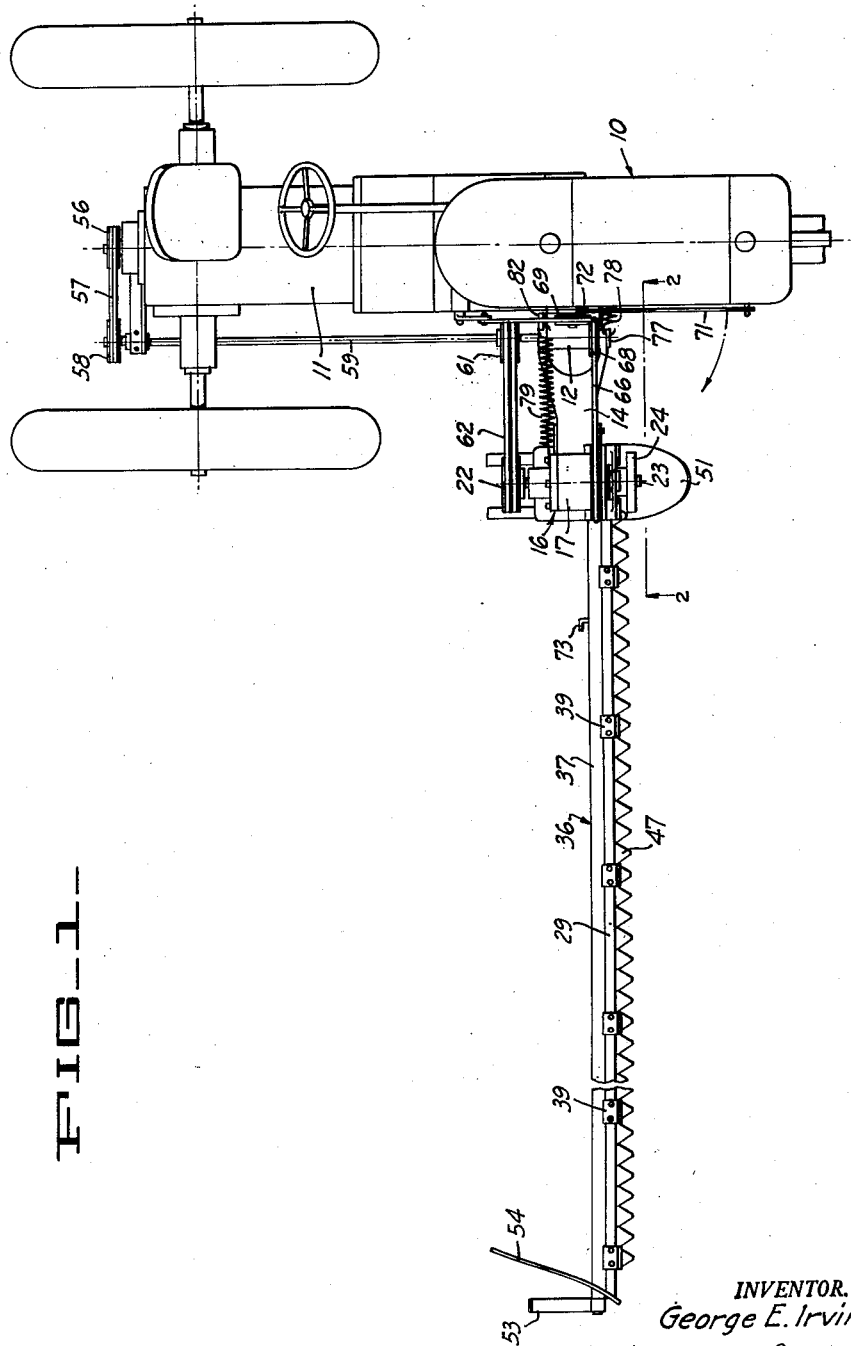
FIG_1
INVENTOR.
George E. Irving
BY
ATTORNEYS

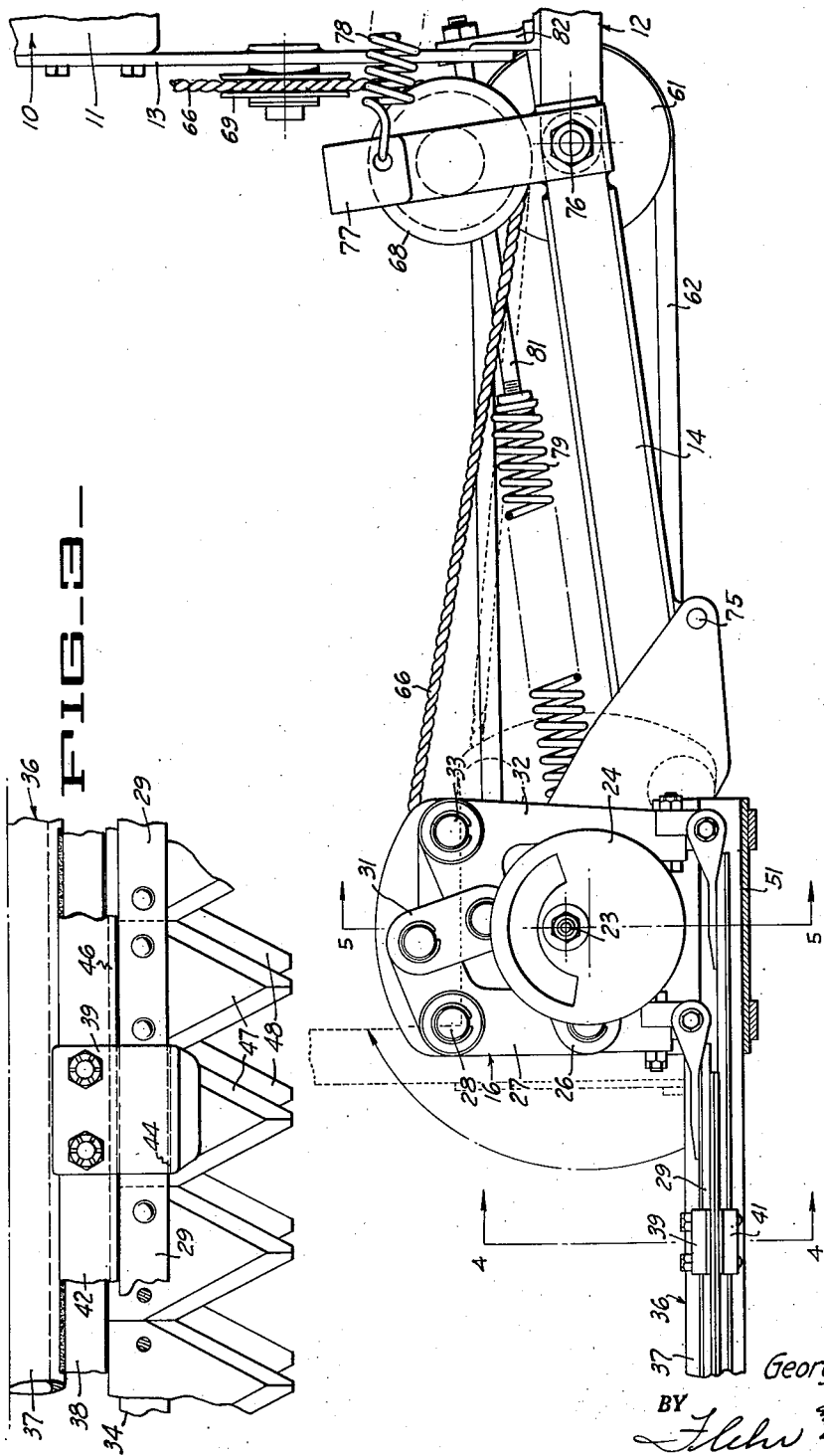

Feb. 18, 1958  G. E. IRVING  2,823,506
DOUBLE SICKLE MOWER
Filed May 13, 1955  5 Sheets-Sheet 3
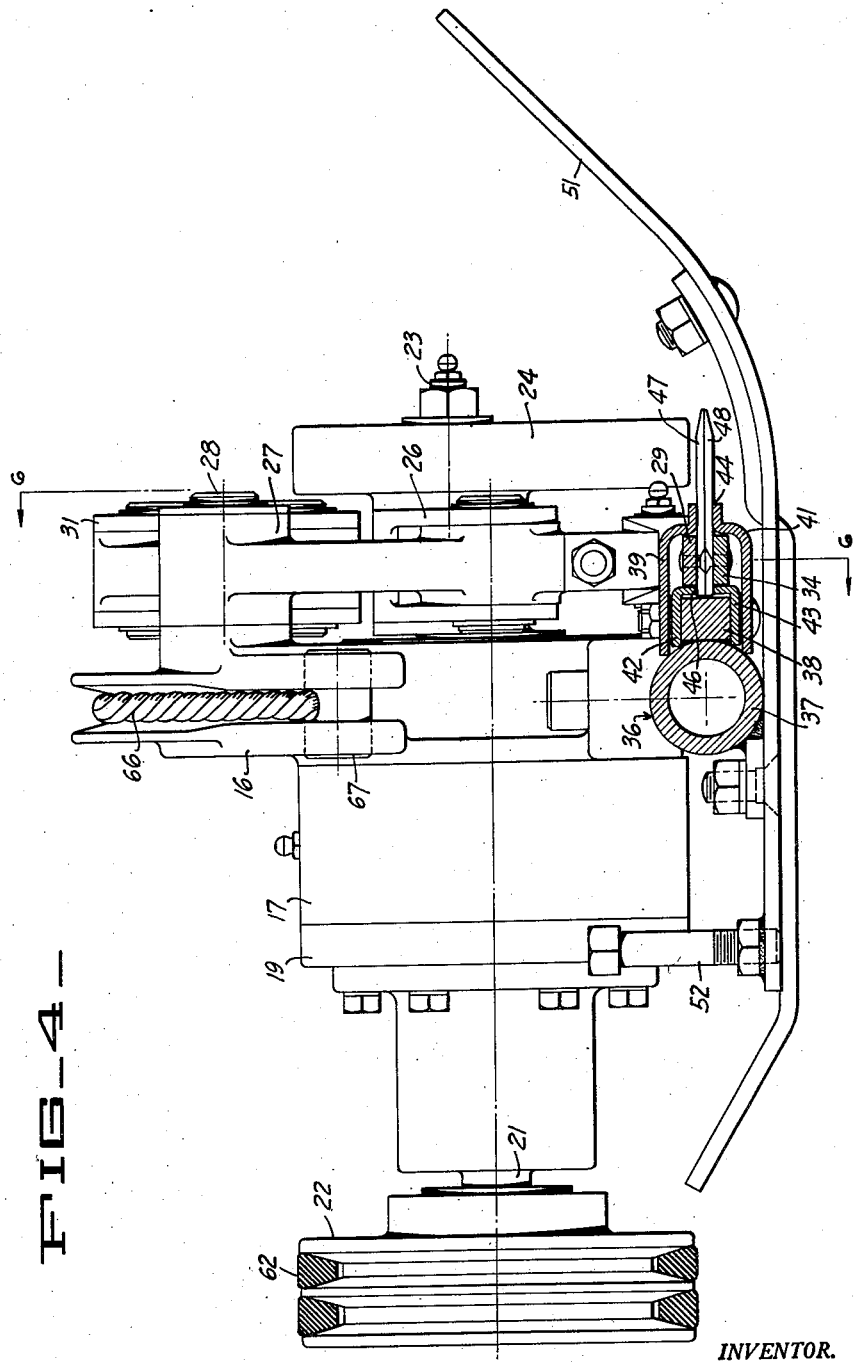
FIG_4_
INVENTOR.
George E. Irving
BY
*Flehr & Swain*
ATTORNEYS

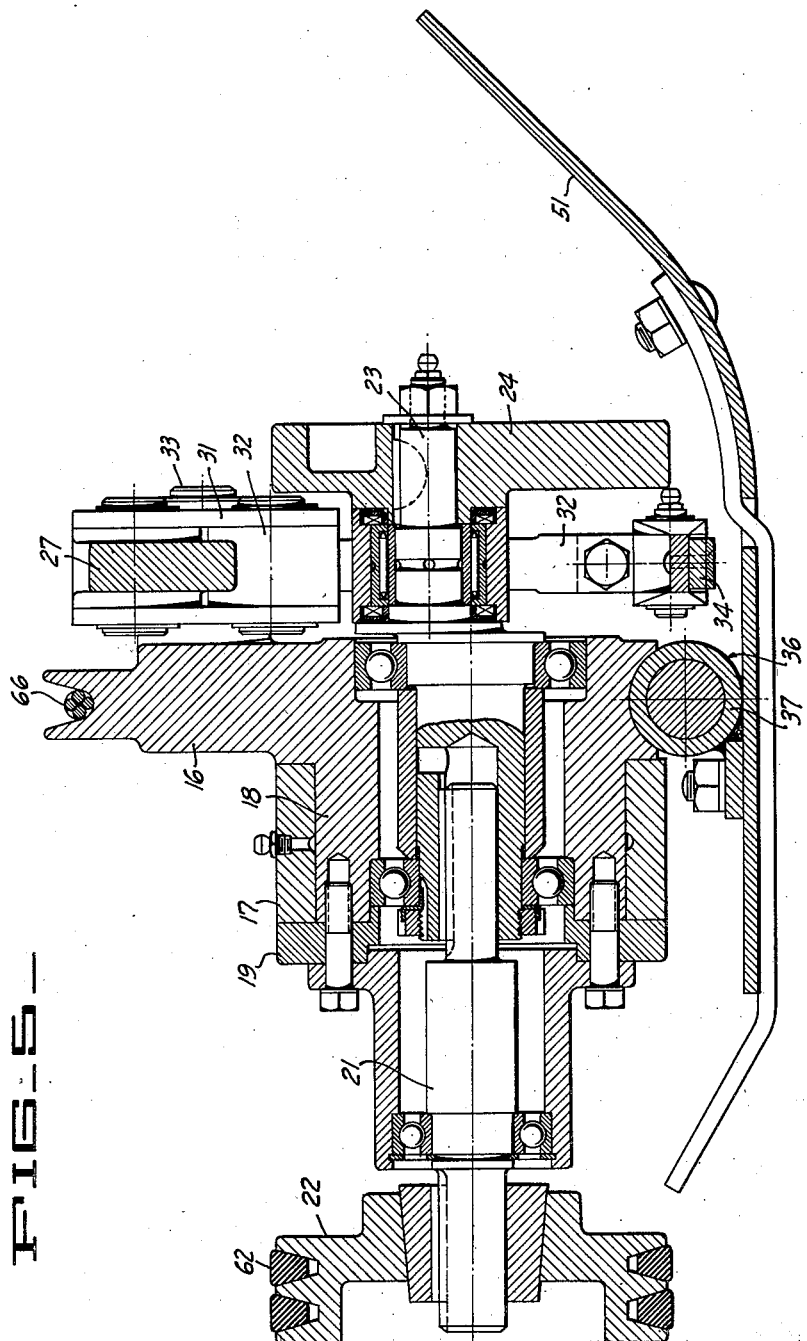

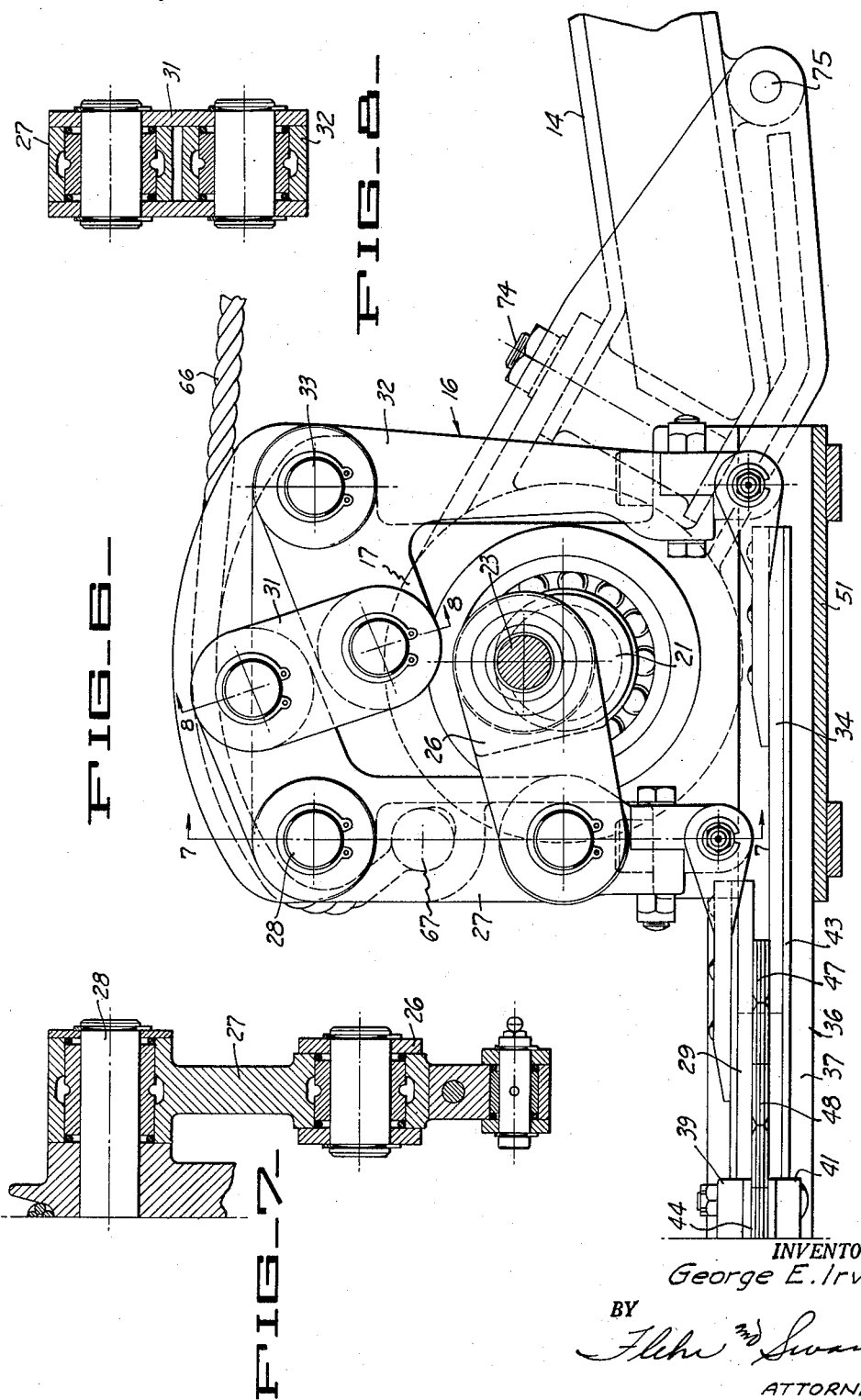

United States Patent Office 2,823,506
Patented Feb. 18, 1958

2,823,506

DOUBLE SICKLE MOWER

George E. Irving, Fresno, Calif., assignor, by mesne assignments, to Bryce L. Parsons, Dos Palos, Calif.

Application May 13, 1955, Serial No. 508,195

6 Claims. (Cl. 56—25)

This invention relates to mowing machines and particularly to double sickle mowers of the type using a pair of reciprocating mowing blades each of which is provided with a plurality of teeth adapted to cooperate with each other to produce a mowing result.

In the past one of the inherent problems faced in the design and operation of mowing machines has been that the juices from the mowed material tend to adhere to the teeth of the sickle bars and cause small fractions of the material being mowed, dust, etc. to adhere to the teeth resulting in a clogging of the teeth. This accumulation has greatly increased the friction created by the actuation of the bars and often completely halts operation. This material must be removed from time to time necessitating a tedious scraping or soaking operation since in most cases, normal periodic lubrication is not adequate to prevent the same. The actuating unit or drive mechanism for the sickle bars of conventional mowing machines has been subject to undue wear because of the high speed required.

In general, it is an object of the present invention to provide a mowing machine in which the above mentioned objectionable features have been eliminated.

Another object of the invention is to provide a mowing machine of the above character in which the speed of the driving mechanism for the sickle bars is reduced without reducing the speed of the cutting blades.

Another object of the invention is to provide a sickle bar assembly which will, in general, prevent gumming of the sickle bar due to an accumulation of dirt and plant juices and other foreign material thereon.

Further objects of this invention will appear from the following description taken in conjunction with the accompanying drawings in which:

Figure 1 is a plan view of my device showing the same attached to a tractor;

Figure 2 is an enlarged front view of a portion of my device showing the method of suspending the same from a tractor;

Figure 3 is an enlarged view of a portion of the cutter bar assembly shown in Figure 2;

Figure 4 is a cross sectional detail taken along the line 4—4 of Figure 2;

Figure 5 is an enlarged cross sectional detail taken along the line 5—5 of Figure 2;

Figure 6 is a cross sectional detail of the device illustrated in Figure 2 taken along the line 6—6 of Figure 4;

Figure 7 is a cross sectional detail taken along the line 7—7 of Figure 6; and

Figure 8 is a cross sectional detail taken along the line 8—8 of Figure 6.

As shown in the drawings, I have provided a mowing machine construction and sickle bar assembly which is, in general, adapted to be mounted upon a conventional tractor, as shown here, of the wheeled type. The connection with the tractor is not important and does not form a part of this invention. It is sufficient to say that the tractor must be provided with a suitable frame from which such a device may be suspended together with a power takeoff means from which power may be taken to provide power for actuating the sickle bars.

Generally speaking the tractor 10 must be provided with a framework 11 from which a frame 12, which forms the supporting frame for my mower, may be suspended. The frame 12 consists of vertical framing numbers 13 and horizontal members 14 and may be secured to the tractor by any suitable means, either permanently, as by means of welding or removably, as by means of nuts and bolts, etc.

To the outer end of the horizontal members 14 I have mounted a body member 16 which is rotatably mounted for movement, in a vertical plane with respect to the horizontal member 14. The member 14 is provided with a horizontally disposed cylindrical sleeve 17 at its outer end which carries a hub 18 on the member 16. Suitable lubricating means is provided and the entire member 16 is adapted to rotate with respect to member 17. The hub 18 is retained in the member 17 by suitable means such as a cap 19 secured to the hub 18 by means of bolts as indicated. The body member 16 accommodates a centrally located drive or crank shaft 21 upon one end of which there is secured a double sheave arrangement 22 and the other end of which is provided with a crank pin 23. The shaft 21 is suitably mounted in ball or needle bearings and is readily rotatable with respect to the body member 16. The pin 23 supports a fly wheel 24 which, as indicated, is eccentric with respect thereto but is concentric with respect to the shaft 21. A connecting rod 26 is mounted on the crank shaft 23 and that end of the connecting rod 26 remote from the shaft 23 is operatively connected to an L-shaped rocker arm 27 which is pivotally connected to the body member 16 at 28. One end of the rocker arm 27 is pivotally connected to, and thereby is adapted to actuate, the upper sickle bar member 29 while the other end of the arm 27 is connected to a link 31 and, thus, through a similar L-shaped rocker arm 32, which is pivotally connected to the member 16 at 33, is adapted to actuate the lower sickle bar 34. It will thus be seen that rotation of the shaft 21, through the connecting rod, rocker arms and link previously described, which are pivotally connected to the housing at points 28 and 33, will cause reciprocation of the sickle bar members 29 and 34 with respect to each other and with respect to the body member 16.

The body member 16 also supports a rigidly connected sickle bar assembly support member 36 which, as shown, consists of a tubular member 37 to one edge of which there is secured a bar 38. Bar 38 is square in section, although it need not necessarily be of this shape, and provides a support for a plurality of clamping members 39 and 41, and 42 and 43. The members 39 and 41 are so formed as to be spaced apart from each other to provide a slot 44 while the members 42 and 43 are so spaced as to provide a slot 46 between their adjacent edges. The slots 44 and 46 are coplanar and are adapted to provide a mounting for sickle bar teeth or section 47 which are mounted on the actuating sickle bar member 29 and teeth or section 48 which are mounted on the sickle bar member 34.

The body member 16 also accommodates a ground engaging shoe 51 which is provided with suitable adjustment means 52. The remote end of the member 37 is likewise provided with a ground engaging shoe 53 and a mold bar 54. It will be noted that the actuating levers and links are so proportioned that the members 29 and 34 are caused to reciprocate, with respect to each other, a distance equal to twice the width of one of the teeth 47 or 48 at its base.

The shaft 21 is actuated by a drive belt assembly as indicated from the power take off means at the rear of the tractor which consists generally of a dual belt assembly from the take off pulley 56, a pair of belts 57, a second pulley 58 mounted on a countershaft 59, and thus through pulley 61 and belts 62. The precise drive is not critical but a drive should be provided in which there is some possibility of slippage in the event the teeth 47 and 48 engage a stone, etc. so that the teeth are not broken. I have found that the belt drive assembly illustrated is satisfactory for this purpose.

As previously pointed out the body member 16 and the assembly including the sickle bar support 37 and the members 29 and 34 are rotatable about the axis of the hub 18 from a mowing position to an elevated or out-of-the-way position. This is accomplished by means of a cable 66 which is connected to the body member 16 at 67 and thus over a pair of sheaves 68 and 69 which are mounted on the frame 12 and which is adapted to be actuated by a hydraulic piston. When the cable 66 is drawn to the right as illustrated in Figure 2 the entire sickle assembly and cutting bar mechanism will be rotated by the hub 18 to an elevated or out of the way position. It may be retained in this position by bar 71 one end of which is suitably secured to the tractor at point 72 and the other of which is merely latched over a suitable latch connection 73 on the member 37.

The sleeve 17 is pivotally mounted upon the member 14 by means of a hinge bolt 74 whereby movement of the same is permitted about the axis of the bolt 74. The pivotal movement of which I speak is normally prevented by a bolt 75 which normally engages the members 14 and 16 but which, when sudden shock is applied to the cutter bar assembly, is adapted to shear and thus prevent breakage of the parts by permitting the body member 16 and all of the parts which are secured thereto to pivot about the bolt 74.

The framework 14 is pivotally mounted at 76 and it should be pointed out that pivot 76 is coaxial with the countershaft 59. The frame 14 is provided with an arm 77, to the upper end of which there is secured a spring 78. A second spring 79 which is secured to the housing 16 is provided with an adjustment bolt 81 which, in turn, is operatively secured to a lug 82 on the frame 14.

Operation of the device may briefly be described as follows: The drive mechanism is connected to the source of power 56 through the belt, sheave, and countershaft arrangement previously described. The springs 78 and 79 are adjusted in such a manner that the framework 14 which carries the power assembly and the cutter bar assembly is resiliently held at a proper predetermined position and the cutter bar assembly is rotated about the axis of the hub 18 by suitable operation of the cable 66 so that the cutter bar assembly is in proper position with respect to the ground and the material to be cut.

As rotary motion is applied to the sheave 22, the connecting rods and links will cause reciprocation of the members 29 and 34, resulting in a mowing action.

It is apparent from the foregoing that I have provided a readily adjustable sickle bar assembly in which the sickle bars reciprocate with respect to each other and in which they are retained in a proper predetermined aligned position.

I claim:

1. In a mowing machine, a frame, a body member rotatably mounted on said frame, a pair of superposed sickle bars, each of said sickle bars having a plurality of cutting blades mounted side by side lengthwise of the bar, means connected to said body member for carrying said sickle bars, a drive shaft mounted in said body member, a crank pin fixed to said drive shaft, a pair of rocker arms pivotally mounted on said body member and connected to said sickle bars, a connecting rod connecting one of said rocker arms to said crank pin, and a link inter-connecting said rocker arms whereby upon rotation of said drive shaft said sickle bars are reciprocated.

2. A machine as in claim 1 together with means for rotating said body member to move the sickle bars between cutting and out-of-the-way positions, said last named means including an elongate flexible member having one end secured to said body member.

3. A machine as in claim 1 wherein each of said sickle bars is reciprocated through a distance equal to the width of one of the cutting blades.

4. In a mowing machine, a frame, a sleeve mounted on said frame, a body member rotatably mounted in said sleeve, a pair of superposed sickle bars, each of said sickle bars having a plurality of cutting blades mounted side by side lengthwise of the bar, means connected to said body member for carrying said sickle bars, a drive shaft coaxially aligned in said body member, a crank pin fixed to said drive shaft, a fly wheel mounted on said crank pin, a pair of rocker arms pivotally mounted on said body member and connected to said sickle bars, a connecting rod inter-connecting one of said rocker arms to said crank pin, and a link connecting said rocker arms whereby upon rotation of said drive shaft said sickle bars are reciprocated.

5. A machine as in claim 4 together with means for rotating said body member in said sleeve to move the sickle bars between cutting and out-of-the-way positions, said last named means including an elongate flexible member having one end connected to said body member.

6. A machine as in claim 5 wherein each of said sickle bars is reciprocated through a distance equal to the width of one of said cutting blades.

References Cited in the file of this patent

UNITED STATES PATENTS 2,324,563    Custenborder _____ July 20, 1943